United States Patent
Ramsey

[11] Patent Number: 5,813,471
[45] Date of Patent: Sep. 29, 1998

[54] LAWN AERATOR WITH AN ARRAY OF AERATION POSTS

[76] Inventor: Philip M. Ramsey, 1014 White Oak Rd., Denver, Pa. 17517

[21] Appl. No.: 936,945

[22] Filed: Sep. 25, 1997

[51] Int. Cl.[6] .................................................. A01B 45/00
[52] U.S. Cl. .................................. 172/21; 172/379; 28/13
[58] Field of Search ........................ 172/21, 22, 41, 172/371, 378, 379, 329; 294/49, 55.5; D8/6–13

[56] References Cited

U.S. PATENT DOCUMENTS

| | | | |
|---|---|---|---|
| D. 309,242 | 7/1990 | Laslo | D8/6 |
| 1,020,762 | 3/1912 | Judson | 172/21 X |
| 1,893,258 | 1/1933 | Washburn | 172/21 |
| 1,965,177 | 7/1934 | Finkl | 172/21 |
| 2,291,160 | 7/1942 | Johnson | 172/21 X |
| 2,987,018 | 6/1961 | Vath | 172/21 X |
| 3,123,391 | 3/1964 | Novak | 172/22 X |
| 3,180,427 | 4/1965 | Leeper, Jr. | 172/21 |
| 3,321,026 | 5/1967 | Hubbard | 172/21 |
| 3,881,553 | 5/1975 | Angeski | 172/22 |
| 4,204,576 | 5/1980 | Mullet et al. | 172/22 |
| 4,791,995 | 12/1988 | Hochlan, Jr. | 172/21 |
| 4,819,735 | 4/1989 | Puckett | 172/21 |
| 4,858,697 | 8/1989 | Sherblom | 172/21 |
| 5,152,348 | 10/1992 | Flanagan, Sr. et al. | 172/21 |
| 5,207,466 | 5/1993 | Ohlson | 172/21 X |

FOREIGN PATENT DOCUMENTS

| | | | |
|---|---|---|---|
| 1114358 | 9/1961 | Germany | 172/21 |
| 813630 | 5/1959 | United Kingdom | 172/21 |
| 1603992 | 12/1981 | United Kingdom | 172/22 |

*Primary Examiner*—Michael J. Carone
*Assistant Examiner*—Christopher J. Novosad

[57] ABSTRACT

A ground aerator is provided including a thin square base plate with a top surface, a bottom surface and a periphery formed therebetween. An array of posts are coupled to the bottom surface of the base plate and extend downwardly therefrom to define a plurality of rows and a plurality of columns. An elongated cylindrical handle is included having a top end with an elastomeric grip formed thereon and a bottom end coupled to a center of the base plate and extending in perpendicular relationship therewith.

4 Claims, 2 Drawing Sheets

5,813,471

LAWN AERATOR WITH AN ARRAY OF AERATION POSTS

BACKGROUND OF THE INVENTION

1. Field of the Invention

The present invention relates to lawn aerators and more particularly pertains to a new lawn aerator with an array of aeration posts for providing a superior device for spot aerating a lawn.

2. Description of the Prior Art

The use of lawn aerators is known in the prior art. More specifically, lawn aerators heretofore devised and utilized are known to consist basically of familiar, expected and obvious structural configurations, notwithstanding the myriad of designs encompassed by the crowded prior art which have been developed for the fulfillment of countless objectives and requirements.

Known prior art lawn aerators include U.S. Pat. No. 4,819,735; U.S. Pat. No. 3,881,553; U.S. Pat. No. Des. 309,242; U.S. Pat. No. 4,858,697; U.S. Pat. No. 5,207,466; and U.S. Pat. No. 4,204,576.

In these respects, the according to the present invention substantially departs from the conventional concepts and designs of the prior art, and in so doing provides a lawn aerator with an array of aeration posts primarily developed for the purpose of providing a superior device for spot aerating a lawn.

SUMMARY OF THE INVENTION

In view of the foregoing disadvantages inherent in the known types of lawn aerators now present in the prior art, the present invention provides a new lawn aerator with an array of aeration posts construction wherein the same can be utilized for providing a superior device for spot aerating a lawn.

The general purpose of the present invention, which will be described subsequently in greater detail, is to provide a new lawn aerator with an array of aeration posts apparatus and method which has many of the advantages of the lawn aerators mentioned heretofore and many novel features that result in a new lawn aerator with an array of aeration posts which is not anticipated, rendered obvious, suggested, or even implied by any of the prior art lawn aerators, either alone or in any combination thereof.

To attain this, the present invention generally comprises a thin square base plate with a top surface, a bottom surface and a periphery formed therebetween. As shown in FIGS. 1 & 2, the top surface has a plurality of vertically oriented triangular supports coupled thereto. Each of such triangular supports extends between a center of the base plate and an associated one of the corners thereof. A tubular sleeve is coupled to the top surface of the base plate at a center thereof. As shown in FIGS. 1 & 3, the tubular sleeve is coupled to inboard edges of the triangular supports and further has a threaded interior surface. Next provided is an array of posts coupled to the bottom surface of the base plate and extending downwardly therefrom. The posts are arranged to define four rows and four columns. Each post includes an upper extent with a inverted frusto-conical configuration and a lower extent having an inverted conical configuration. Finally, an elongated cylindrical handle is provided having a top end with an elastomeric grip formed thereon. A bottom end is equipped with a plurality of threaded grooves formed thereon. Such grooves allow for the screwably coupling of the handle within the tubular sleeve such that the handle extends perpendicularly with respect to the base plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lawn aerator with an array of aeration posts apparatus and method which has many of the advantages of the lawn aerators mentioned heretofore and many novel features that result in a new lawn aerator with an array of aeration posts which is not anticipated, rendered obvious, suggested, or even implied by any of the prior art lawn aerators, either alone or in any combination thereof.

It is another object of the present invention to provide a new lawn aerator with an array of aeration posts which may be easily and efficiently manufactured and marketed.

It is a further object of the present invention to provide a new lawn aerator with an array of aeration posts which is of a durable and reliable construction.

An even further object of the present invention is to provide a new lawn aerator with an array of aeration posts which is susceptible of a low cost of manufacture with regard to both materials and labor, and which accordingly is then susceptible of low prices of sale to the consuming public, thereby making such lawn aerator with an array of aeration posts economically available to the buying public.

Still yet another object of the present invention is to provide a new lawn aerator with an array of aeration posts which provides in the apparatuses and methods of the prior art some of the advantages thereof, while simultaneously overcoming some of the disadvantages normally associated therewith.

Still another object of the present invention is to provide a new lawn aerator with an array of aeration posts for providing a superior device for spot aerating a lawn.

Even still another object of the present invention is to provide a new that includes a thin square base plate with a top surface, a bottom surface and a periphery formed therebetween. An array of posts are coupled to the bottom surface of the base plate and extend downwardly therefrom to define a plurality of rows and a plurality columns. An elongated cylindrical handle is included having a top end with an elastomeric grip formed thereon and a bottom end coupled to a center of the base plate and extending in perpendicular relationship therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
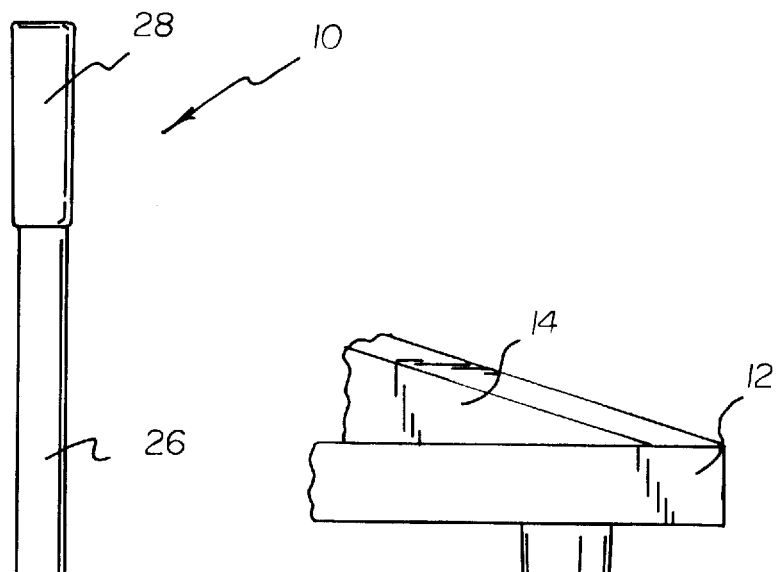
FIG. 2 is a close up view of the base plate of the present invention.

With reference now to the drawings, and in particular to FIGS. 1 through 4 thereof, a new lawn aerator with an array of aeration posts embodying the principles and concepts of the present invention and generally designated by the reference numeral 10 will be described.

Figure 1:
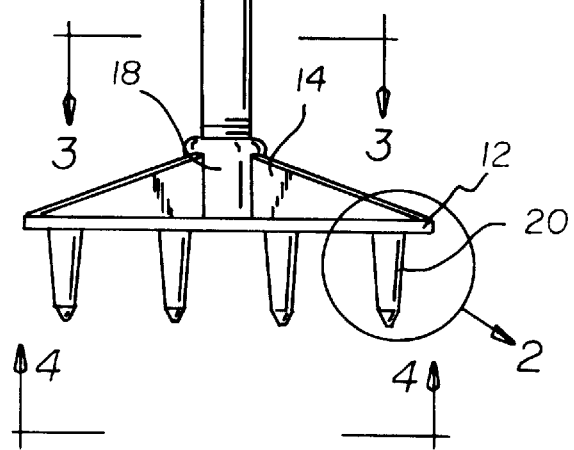
FIG. 1 is a side view of a new lawn aerator with an array of aeration posts according to the present invention.

The present invention, as designated as numeral 10, includes a thin square base plate 12 with a top surface, a bottom surface and a periphery formed therebetween. In the preferred embodiment, the base plate has a surface area of 64 square inches. As shown in FIGS. 1 & 2, the top surface has a plurality of vertically oriented triangular supports 14 coupled thereto. Each of such triangular supports extends between a center of the base plate and an associated one of the corners thereof. An upper edge of such supports extends downward from a center of the base plate to the periphery thereof.

Figure 3:
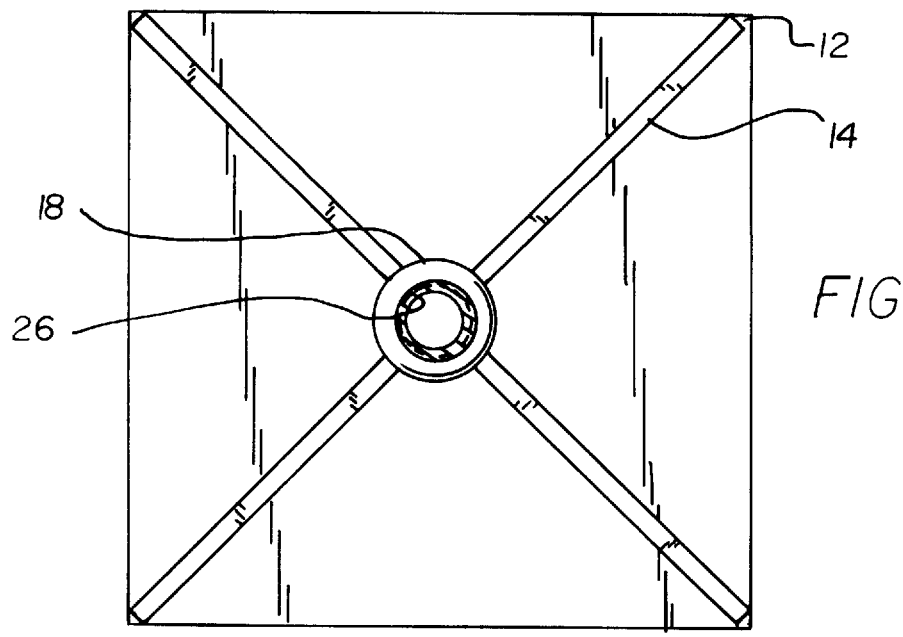
FIG. 3 is a top view of the present invention.
Figure 4:
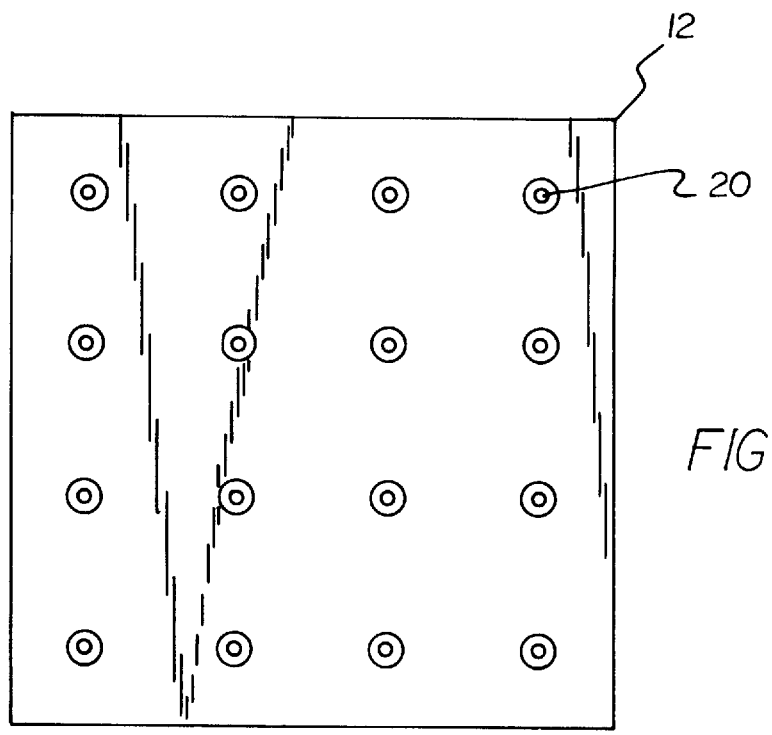
FIG. 4 is a bottom view of the present invention.

A tubular sleeve 18 is coupled to the top surface of the base plate at a center thereof. As shown in FIGS. 1 & 3, the tubular sleeve is coupled to inboard edges of the triangular supports and further has a threaded interior surface.

Next provided is an array of posts 20 coupled to the bottom surface of the base plate and extending downwardly therefrom. Each post ideally has a height of about 2 inches and a diameter ranging between 7/16 of an inch to 5/16 of an inch. The posts are arranged to define four rows and four columns. Preferably, the posts are spaced from the periphery ½ a length between each pair of adjacent posts. Each post includes an upper extent 22 with a inverted frusto-conical configuration and a lower extent 24 having an inverted conical configuration. As shown in FIG. 2, the upper extent of each post has a length of at least 8 times that of the lower extent.

Finally, an elongated cylindrical handle 26 is provided having a top end with an elastomeric grip 28 formed thereon. An exterior surface of the grip is smooth. A bottom end of the handle is equipped with a plurality of threaded grooves 30 formed thereon. Such grooves allow for the screwably coupling of the handle within the tubular sleeve such that the handle extends perpendicularly with respect to the base plate. In the preferred embodiment, the handle has a height of about 45 inches and a diameter of about 1 inch.

During use, a user may insert the posts within the ground and wiggle the same by gyrating the handle. The present invention is thereafter removed from the ground and aeration ensues. It should be noted that the present invention is ideal for aerating hard to reach areas.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ground aerator comprising, in combination:

a square base plate with a top surface, a bottom surface and a periphery formed therebetween, the top surface having a plurality of vertically oriented triangular supports coupled thereto and each extending between a center of the base plate and an associated one of the corners thereof and a tubular sleeve coupled to the top surface of the base plate at a center thereof, wherein the tubular sleeve is coupled to inboard edges of the triangular supports and further has a threaded interior surface;

an array of posts coupled to the bottom surface of the base plate and extending downwardly therefrom to define four rows and four columns, each post including an upper extent with a inverted frusto-conical configuration and a lower extent having an inverted conical configuration; and an elongated cylindrical handle having a top end with an elastomeric grip formed thereon and a bottom end with a plurality of threaded grooves formed thereon for screwably coupling within the tubular sleeve such that the handle extends perpendicularly with respect to the base plate.

2. A ground aerator comprising:

a rectilinear base plate with a top surface, a bottom surface and a periphery formed therebetween;

an array of posts coupled to the bottom surface of the base plate and extending downwardly therefrom to define a plurality of rows and a plurality of columns; and an elongated cylindrical handle having a top end with an elastomeric grip formed thereon and a bottom end coupled to a center of the base plate and extending in perpendicular relationship therewith;

wherein the top surface has a plurality of vertically oriented triangular supports coupled thereto each extending between the center of the base plate and an associated one of the corners thereof.

3. The ground aerator as set forth in claim 2 wherein each post includes an upper extent with a inverted frusto-conical configuration and a lower extent having an inverted conical configuration.

4. The ground aerator as set forth in claim 2 wherein the handle is coupled to the base plate by way of a sleeve which is coupled to inboard edges of the triangular supports.

\* \* \* \* \*